UNITED STATES PATENT OFFICE.

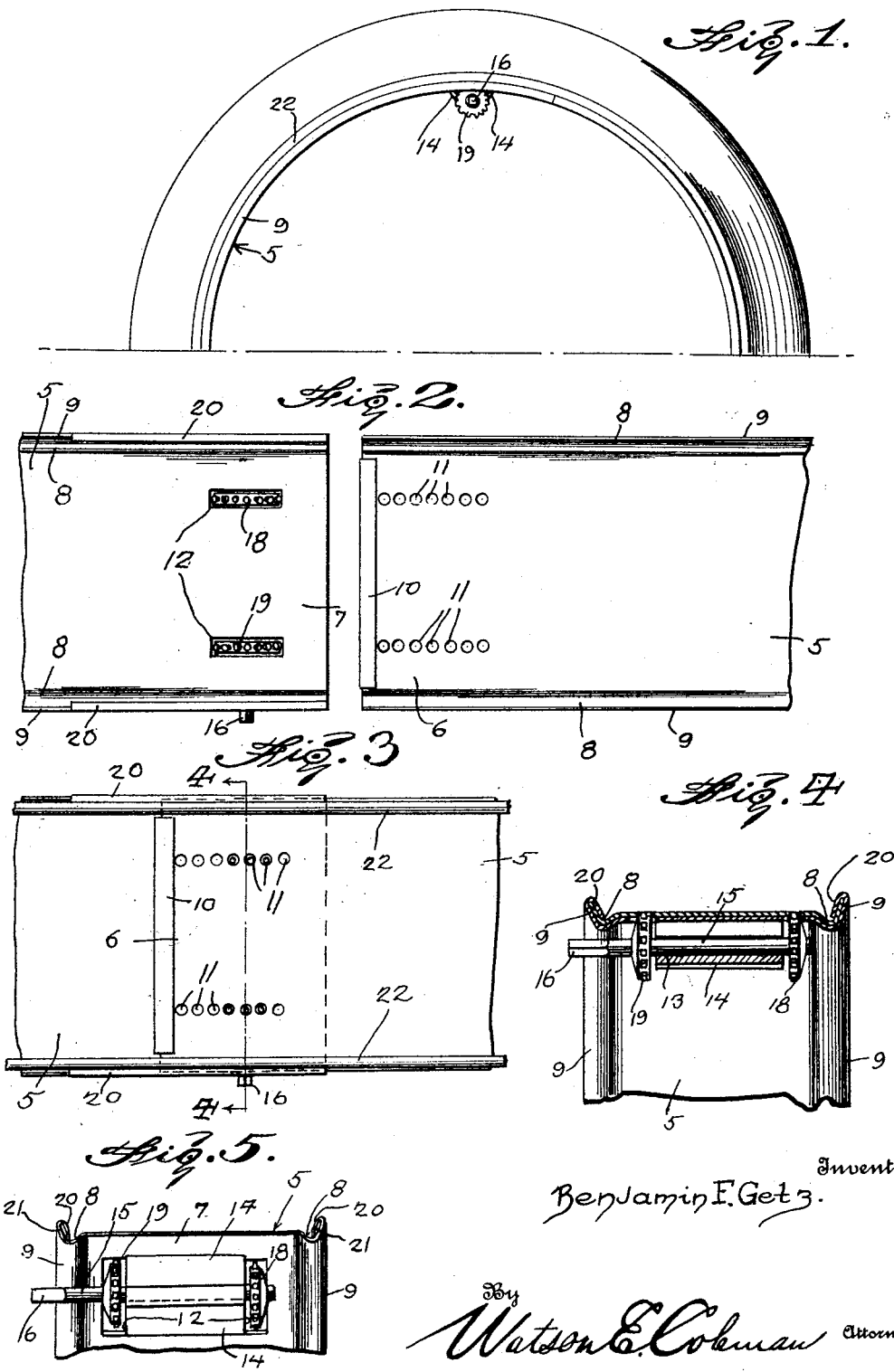

BENJAMIN F. GETZ, OF MECHANICSBURG, PENNSYLVANIA.

TIRE-RIM CONSTRUCTION.

1,404,286.

Specification of Letters Patent.   Patented Jan. 24, 1922.

Application filed June 29, 1921. Serial No. 481,432.

*To all whom it may concern:*

Be it known that I, BENJAMIN F. GETZ, a citizen of the United States, residing at Mechanicsburg, in the county of Cumberland and State of Pennsylvania, have invented certan new and useful Improvements in Tire-Rim Constructions, of which the following is a specification, reference being had to the accompanying drawings.

This invention relates to tire rim construction, and has for its object to provide a tire rim including means for increasing or decreasing the diameter of the rim to permit application of the tire.

It is another object of the invention to provide a rim of this character which is split at one point, one end portion of the rim being provided with rack means, the opposite end portion of the rim being provided with means for engagement with the rack to move said end portions toward or away from each other in overlapping relation.

It is also an object of the invention to provide a rim of this character having grooves formed in its edges for the reception of rings, and means carried by the split rim for expanding the rim into engagement with the rings to prevent removal of the tire.

It is still a further object of the invention to provide a rim of this character wherein one end portion of the rim is adapted to substantially telescope the opposite end portion, and wherein one of said end portions is provided with gears adapted to engage the opposite end portion to move said end portions in opposite directions.

With these and other objects in view, the invention consists in the improved construction and arrangement of parts to be hereinafter more particularly described, fully claimed and illustrated in the accompanying drawings, in which:—

Figure 1 is a fragmentary side elevation of a tire rim constructed in accordance with an embodiment of the invention, Figure 2 is a fragmentary top plan view showing the end portions of the rim separated, Figure 3 is a top plan view showing the ends of the rim connected, Figure 4 is a section taken on the line 4—4 of Figure 3, and Figure 5 is a fragmentary perspective view of one end of the rim.

Referring to the drawings, 5 designates a tire rim which is split at one point to provide end portions 6 and 7. Each edge of the rim is provided with an annular groove 8, said groove being substantially U-shaped in cross section, the formation of the groove causing the edge of the rim to extend beyond the periphery of the rim to provide a flange 9, the purpose of which will be hereinafter described.

Carried by the extremity of the end 6 is a reinforcing strip 10, while disposed adjacent the extremity of the end 6 is a series of openings 11, one series of openings being positioned adjacent each of the grooves 8, and also longitudinally of the rim. The portions of the rim between the openings 11 substantially provide rack teeth. It is of course obvious that a conventional form of rack may be connected to the rim if desired. Any number of openings may be provided in each of the series according to the amount of retraction or expansion necessary in the application of the tire.

The end portion 7 is provided with a pair of slots 12 which are disposed adjacent the extremity of said end portion, and in spaced relation to each other, while extending laterally of the rim and projecting from the inner face of the same is a bearing 13, said bearing extending between the slots 12, braces 14 being provided to prevent distortion or movement of the bearing when the rim is being expanded or retracted. The bearing 13 is adapted to receive a shaft 15, the end 16 of the shaft projecting beyond one edge of the rim, said end being substantially rectangular in cross section so as to permit a wrench or like implement to be engaged therewith for the purpose of rotating the shaft in either direction. The opposite end portion 17 of the shaft is adapted to extend beyond the end of the bearing for the reception of a sprocket wheel 18, a portion of said sprocket wheel being adapted to extend through one of the slots 12. The portion of the shaft 15 disposed immediately beneath the remaining slot 12 is adapted to receive a sprocket wheel 19, a portion of the sprocket wheel 19, similar to the sprocket wheel 18, being adapted to extend through the slot. The sprocket wheels 18 and 19 are so arranged that the teeth thereof project beyond the periphery of the rim, each of said slots being of a length slightly greater than the diameter of the sprocket to permit unobstructed movement of the sprocket through the slots.

The extremities of the flanges 9 of the end portion 7 are provided with elongated extensions 20, each of said extensions being extended back upon the flanges 9 and inwardly of the grooves 8 to provide guides 21. The guides are adapted to extend from the extremity of the end portion 7 to a point beyond the sprocket wheel 18, and are adapted to receive a portion of the flanges 9 carried by the end portion 6. The extremities of the flanges 9 at the extremity of the end portion 6 are tapered to facilitate the insertion of the flanges into the guides. The purpose of the guides is to permit the end portion 6 to substantially telescope the end portion 7, so as to urge said end portions into engagement with each other, and permit the teeth of the gears 18 and 19 to enter the openings 11.

In view of this arrangement, when the shaft 15 is rotated by means of a wrench or any suitable means, the sprocket wheels through the medium of the portions of the rim between the openings 11, cause the end portions 6 and 7 to move in overlapping relation in opposite directions so as to decrease the diameter of the rim. Rings 22 are provided for engagement with the rim, each of said rings being substantially triangular in cross section, and having their inner walls curved for engagement with the grooves 8, said rings being adapted to hold the tire in engagement with the rim in the well known manner. After the tire and the rings have been applied to the rim, the shaft 15 is rotated in the opposite direction to that mentioned above, so as to move the end portions in the opposite directions substantially away from each other, thereby expanding the rim firmly into engagement with the rings 22. Through the cooperation of the guides 21 and the teeth formed by the openings 11, it is impossible for the rim to accidentally retract as a locking action takes place after the rim has been expanded to the extent desired.

From the foregoing it will be readily seen that this invention provides novel and simple means for conveniently and quickly removing and applying a tire to a rim, as the rim may be decreased to the diameter necessary to permit the tire to engage the periphery of the rim. Furthermore, it is not absolutely necessary to secure a conventional form of rack or to provide like projecting parts, as the rack is formed by the portions of the rim disposed between the series of openings. In additional to this, the guides serve to prevent disengagement of the end portion 6 from the end portion 7, so that there is no danger of the end portion 6 slipping from engagement with the gears 18 and 19, and any implement, such as a wrench, may be used to rotate the shaft 15.

What is claimed is:—

1. A tire rim structure of the character described comprising a split rim, one end portion of the rim having a series of openings, gear means rotatably mounted on the opposite end portion of the rim and adapted to extend through said last mentioned end portion of the rim into said openings, and means for rotating said gears means.

2. A tire rim structure of the character described comprising a split rim, spaced annular grooves formed in said rim for the reception of tire holding means, guide means carried by one end portion of the rim and adapted to receive the opposite end portion of the rim, a series of openings formed in the second mentioned end portion of the rim, sprocket wheels carried by the first mentioned end portion of the rim, said wheels extending through the periphery of the rim and into the openings of the second mentioned end portion of the rim, said guides serving to hold the second mentioned end portion of the rim into engagement with the first mentioned end portion of the rim.

3. A tire rim structure of the character described, comprising a split rim, one end portion of said rim having spaced longitudinally extending slots, the opposite end portion of said rim having two series of openings, said openings being adapted to substantially register with the slots, a shaft rotatably mounted on the inner face of the first mentioned end portion of the rim, sprocket wheels mounted on said shaft in spaced relation to each other, a portion of the teeth of said wheels being adapted to extend through said slots and into the adjacent openings of said series.

In testimony whereof I hereunto affix my signature.

BENJAMIN F. GETZ.